(12) United States Patent
Aranzulla et al.

(10) Patent No.: US 10,994,692 B2
(45) Date of Patent: May 4, 2021

(54) FRONTAL AIRBAG

(71) Applicant: TRW AUTOMOTIVE GMBH, Alfdorf (DE)

(72) Inventors: Daniele Aranzulla, Mutlangen (DE); Martin Burkhardtsmaier, Schwäbisch-Gmünd (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 98 days.

(21) Appl. No.: 16/481,850

(22) PCT Filed: Jan. 25, 2018

(86) PCT No.: PCT/EP2018/051794
§ 371 (c)(1),
(2) Date: Jul. 30, 2019

(87) PCT Pub. No.: WO2018/141616
PCT Pub. Date: Aug. 9, 2018

(65) Prior Publication Data
US 2019/0351862 A1 Nov. 21, 2019

(30) Foreign Application Priority Data

Jan. 31, 2017 (DE) .................... 10 2017 101 896.4

(51) Int. Cl.
*B60R 21/2342* (2011.01)
*B60R 21/205* (2011.01)
*B60R 21/2338* (2011.01)
*B60R 21/00* (2006.01)

(52) U.S. Cl.
CPC ........ *B60R 21/2342* (2013.01); *B60R 21/205* (2013.01); *B60R 21/2338* (2013.01); *B60R 2021/0044* (2013.01); *B60R 2021/0048* (2013.01); *B60R 2021/23382* (2013.01)

(58) Field of Classification Search
None
See application file for complete search history.

(56) References Cited

U.S. PATENT DOCUMENTS

| 6,308,983 | B1 * | 10/2001 | Sinnhuber | ............. B60R 21/233 |
| | | | | 280/735 |
| 9,758,123 | B2 * | 9/2017 | Yamada | ............. B60R 21/2338 |
| 2003/0218325 | A1 * | 11/2003 | Hasebe | ............... B60R 21/2338 |
| | | | | 280/743.2 |
| 2007/0045997 | A1 * | 3/2007 | Abe | ...................... B60R 21/231 |
| | | | | 280/729 |
| 2011/0101655 | A1 * | 5/2011 | Ishida | ................... B60R 21/231 |
| | | | | 280/729 |
| 2017/0355346 | A1 * | 12/2017 | Kobayashi | .......... B60R 21/0136 |
| 2018/0056922 | A1 * | 3/2018 | Yamada | ................ B60R 21/235 |

(Continued)

*Primary Examiner* — Drew J Brown
(74) *Attorney, Agent, or Firm* — Tarolli, Sundheim, Covell & Tummino LLP

(57) ABSTRACT

A frontal airbag for vehicle occupants comprises a contact panel (26) facing the vehicle occupant in the inflated state and including upper and lower edges (146, 148) as well as two lateral edges (150). In the interior of the airbag, tension means (30) that withhold portions of the contact panel (26) in the inflated state are arranged at the contact panel (26) so that the contact panel has plural indentations. The contact panel (26) is composed of plural interconnected cut parts (42, 44).

20 Claims, 5 Drawing Sheets

(56) References Cited

U.S. PATENT DOCUMENTS

| | | | |
|---|---|---|---|
| 2018/0126946 A1* | 5/2018 | Bausch | B60R 21/2338 |
| 2018/0154856 A1* | 6/2018 | Yamada | B60R 21/205 |
| 2018/0154857 A1* | 6/2018 | Yamada | B60R 21/231 |
| 2018/0345901 A1* | 12/2018 | Yamada | B60R 21/205 |
| 2018/0354450 A1* | 12/2018 | Yamada | B60R 21/23138 |
| 2019/0308582 A1* | 10/2019 | Stegmeier | B60R 21/233 |
| 2020/0010044 A1* | 1/2020 | Yamada | B60R 21/233 |
| 2020/0023804 A1* | 1/2020 | Weiss | B60R 21/2338 |
| 2020/0039460 A1* | 2/2020 | Zink | B60R 21/2338 |
| 2020/0122677 A1* | 4/2020 | Yamada | B60R 21/216 |

* cited by examiner

FRONTAL AIRBAG

RELATED APPLICATIONS

This application corresponds to PCT/EP2018/051794 filed Jan. 25, 2018, which claims the benefit of German Application No. 10 2017 101 896.4 filed Jan. 31, 2017, the subject matter of which are incorporated herein by reference in their entirety.

BACKGROUND OF THE INVENTION

The invention relates to a frontal airbag for vehicle occupants, especially a passenger airbag, comprising a contact panel facing the vehicle occupant in the inflated state and having an upper edge, a lower edge as well as two lateral edges, wherein tension means restraining portions of the contact panel in the inflated state of the airbag are attached to the contact panel in the interior of the airbag.

An airbag of this type is known from DE 10 2015 004 956 A1. In said airbag, the beads formed by the indentations are differently large so that the lateral beads extend more closely to the occupant than the central beads in order to hold the vehicle occupant in the case of diagonal impact.

SUMMARY OF THE INVENTION

It is the object of the invention to design a frontal airbag for vehicle occupants restraining the head and chest area of the occupant in such manner that the airbag, on the one hand, ensures even further improved restraining values in the case of diagonal impact and, on the other hand, is easy to manufacture. Moreover, the frontal airbag is intended to be folded in a reproducible manner.

The object is achieved, on the one hand, by a frontal airbag of the afore-mentioned type which is characterized in that the contact panel is composed of plural interconnected cut parts. Said cut parts help to easily realize the indentations and the beads interposed between the indentations. In addition, the beads and the indentations can be designed in a more distinct manner.

As recent examinations have found, in the event of head impact of the occupant, the indentations enable the contact panel adjacent to the contact area to be re-drawn in the adjacent areas by the immersion of the head, whereas in the previous frontal airbags having substantially no distinct indentations the head upon impact is "held" on the substantially hardly curved surface of the airbag and, in this way, the head is rotated. This is due to the fact that the hardly curved surface is not capable of being laterally moved together with the head diagonally impacting thereon. The invention allows the area of the contact panel on which the occupant impacts to be also laterally moved, because additional airbag panel material is available, thus causing the rotational movement of the head to be reduced.

Vis-à-vis previous airbags, the contact panel has an increased surface. Consequently, more panel material is available which, however, is more difficult to fold in an exactly reproducible manner.

Moreover, the object is achieved with respect to the reproducible folding of the frontal airbag according to the invention by the fact that the indentations are closed by tear seams prior to complete deployment of the airbag, with the tear seams being configured so that they can be destroyed upon complete inflation of the airbag. The tear seams ensure the fabric portions of the contact panel to be located in a defined manner relative to each other and to be capable of adopting an exacter position relative to each other in the folded state than without said tear seams.

The tear seams extend vertically and/or in parallel to each other, relating to the partially deployed mounted state of the airbag.

The indentations and the beads between the indentations also extend preferably vertically and/or in parallel to each other, especially along the entire height of the airbag, again related to the mounted and inflated airbag.

At least several, preferably the central, cut parts are longer than wide in the vertical direction, i.e. they are strip-shaped. This definition, too, is related to the mounted and inflated state of the airbag.

Preferably, each cut part defines a bead of the airbag.

In order to facilitate manufacture of the airbag and to provide as few seams as possible, several, preferably all cut parts continuously extend from the upper edge to the lower edge of the airbag. In this context, it is emphasized that, of course, the upper and lower edges as well as the lateral edges of the contact panel cannot be defined as a square-edged end of the airbag in the area of the contact panel, for the edges are rounded to merge into a rear panel to which the contact panel is connected. The upper and lower edges as well as the lateral edges always refer to the mounted and inflated state from the viewpoint of the associated occupant.

At least several, but preferably all of the cut parts should be fastened to a rear panel in the area of the upper and lower edges. The cut parts thus jointly form the contact panel, whereas they need not form the rear panel. In this way, the contact panel and the rear panel can be geometrically formed very independently of each other.

In order to form the indentations, it is advantageous when at least several, preferably all of the cut parts have an upper end and a lower end which are horizontally narrower than the central area located between the ends. For defining said geometry of the cut parts, they are flatly spread in the non-connected state with the upper edge facing upwards and the lower edge facing downwards.

In this state, it is also defined that at least several, preferably all of the cut parts are laterally outwardly bulging in the central area. In the peripheral area of the bulges, adjacent cut parts are connected, preferably sewn, to each other. In this way, additional material is provided by which the indentations are configured.

The indentations have different depths as compared to an envelope of the contact panel. Preferably, the indentations are configured so that they are increasingly deeper in the central area from the upper and lower ends.

The cut parts in the central area may include vertical, substantially linear peripheral portions from which the central area extends in continuous curvatures to the vertical ends. In this case, too, the cut parts are spread while not being interconnected, but are orientated so that the upper edges thereof are orientated upwards and the lower edges thereof are orientated downwards in the opposite direction. The linear peripheral portions provide for the deepest points of the indentations in which they have a uniform depth. In addition, linear peripheral portions also facilitate to attach adjacent cut parts by sewing.

The contact panel may be defined by a lateral cut part at each of the lateral ends. Between said lateral cut parts plural central cut parts are located. At least one of the central cut parts, preferably all central cut parts, have corners in the non-sewn condition. Said corners are formed by a transition from the upper and lower edges to the lateral edges in the central area. Upper and lower corners are opposed to each other in pairs and thus are assigned to each other. Of preference, virtual connecting lines extend in parallel to each other between upper and lower corners assigned to each other in the spread state of the cut part. Thus, substantially vertical beads of the airbag which extend in parallel to each other are defined. The bulges extending on the side of the connecting lines then primarily define the deepest portions of the indentations.

In the inflated and mounted state of the airbag, the contact panel may form at least one vertically extending elongate bead, with portions of the contact panel being formed at the at least one bead by adjacent bulges of two adjacent interconnected cut parts.

The bead may also be configured without any tension means so as to bulge outwardly as far as possible in the direction of the occupant. In this context, it is advantageous when said bead composed of plural cut parts is arranged on a side of the airbag that is close to the adjacent vehicle occupant.

As already explained, the contact panel may be defined at each of the lateral ends by a lateral cut part. Said cut part may have a substantially crescent-shaped cut. The short side of the crescent extends preferably convexly somewhat to the outside but not as convexly as the large curved side of the crescent.

In the area of the vertical peripheral edges of cut parts the tension means may be arranged to define the indentations.

For facilitating the fastening of the tension means, the tension means may equally be fastened on the contact panel by the fasteners that fasten adjacent cut parts to each other. Usually one or more connecting seams are provided as connectors.

The rear panel may be in the form of a one-piece cut part.

A preferred shape of the rear panel consists in the latter having two linear edges extending substantially in opposite directions. Said edges may enclose an angle of 150° to 180°, which is not meant to be limiting. At the remote ends of said linear edges, the latter merge into a curved peripheral portion. The curved peripheral portion interconnects the remote ends of the linear edges. Preferably, the curved peripheral portion may consist of three convex areas, with adjacent convex areas being connected to each other by respective concave areas. The curved peripheral portion preferably includes no abrupt steps or shoulders. Rather, the curved peripheral portion consists of a continuously curved panel.

The tension means are especially tethers. Said tethers may be fastened to the rear panel or to a reinforcing layer in the area of the inflation mouth or the mounting of the airbag on the module or on the inflator.

The tethers extend vertically in the inflated mounted state, for example, but are rotated about 90° until they are fastened to the rear panel.

Tethers may also be coupled to each other at their rear mounting end so that, when viewed from above, a V-shaped tether extension is produced.

The frontal airbag according to the invention has at least two, especially three indentations and, correspondingly, at least three, preferably four beads extending substantially vertically.

The beads may be different in width, relating to the mounted and inflated state, especially the lateral cut parts may result in wider bulges than the central cut parts.

A tension means inside the airbag according to the invention may extend so that the rear panel is held more closely to the contact panel, distant from its module-side mounting area, than without said tension means. In this way, the frontal airbag which is usually accommodated in the instrument panel is intended to be prevented from hitting a monitor disposed at the instrument panel.

BRIEF DESCRIPTION OF THE DRAWINGS

Further advantages and features of the invention will be resulting from the following description and from the following drawings which are referred to and wherein.

DESCRIPTION

Figure 1:
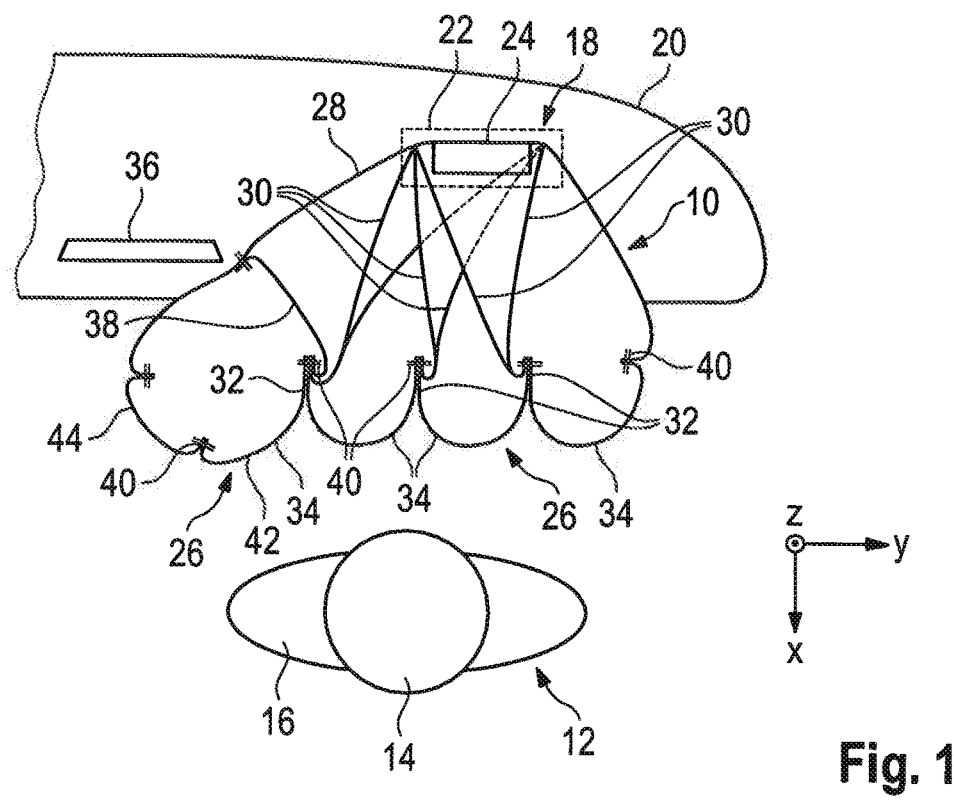
FIG. 1 shows a simplified schematic top view onto a horizontally cut frontal airbag according to the invention in the mounted and inflated state.

FIG. 1 illustrates a frontal airbag 10, more exactly speaking a front passenger airbag. The airbag 10 is shown in a horizontal section from above in the mounted, completely inflated state. The longitudinal vehicle direction, in the driving direction, takes the coordinate x and the transverse vehicle direction, in the horizontal direction, takes the coordinate y. The vertical direction is the direction designated with the coordinate z.

The occupant 12 is shown with his/her head 14 and his/her torso 16.

The airbag 10 is part of an airbag module 18 which is shown symbolized by broken lines and is mounted within or beneath the instrument panel 20 and exits the latter. The module housing takes the reference numeral 22. In the module housing, an inflator 24 by means of which the airbag 10 is inflated is accommodated.

In the folded state, the airbag 10 is completely accommodated in the module housing 22.

It is emphasized that the inflator 24 may be a one-stage or multi-stage inflator including one or more discharge openings spaced apart from each other. Alternatively, also plural inflators 24 are possible.

The airbag 10 has an outer panel including plural portions and areas, the area facing the vehicle occupant 12 being referred to as contact panel 26. A panel opposed to the contact panel 26 is the rear panel 28. Said rear panel 28 faces the instrument panel 20 and the windscreen.

The rear panel 28 is the panel which is fastened on the airbag module side and through which the airbag 10 is locked to the vehicle in the inflated state.

In the interior of the airbag 10 plural tension means 30 are provided in the form of tethers. Said tension means 30 are fastened at one end to the rear panel 28 or else to the module housing 22 or to any part connected thereto. The opposite end of each tension means 30 is fastened to the contact panel 26 and prevents the contact panel 26, during inflation, from being moved unhindered in the fastened area in the direction of the occupant 12. Via the tension means 30 plural indentations 32 and convex beads 34 formed between the indentations 32 and facing the occupant are resulting. Said beads 34 extend substantially vertically with respect to the mounted inflated state.

Depending on the airbag material available between adjacent indentations 32, the extension curved in cross-section as shown in FIG. 1 may result for the beads 34. Depending on whether more or less airbag material is provided, the beads 34 may be bulged more or less strongly.

A larger bead in this case is the left-hand bead which also is the bead 34 of the airbag 10 ending toward the driver sitting on the left side. Optionally, but not mandatorily, said left-hand bead, more exactly the bead 34 facing the adjacent vehicle occupant, may extend somewhat further in the x direction than the neighboring beads to offer an additional barrier against lateral slipping. This is only an option, as stated before.

Behind said bead on the left in FIG. 1, a monitor 36 rising on the instrument panel 20 and projecting from the latter is provided. For preventing the airbag 10 from getting caught by the monitor 36, from destroying or tearing off the latter during deployment, additional tension means 38 is provided which connects the contact panel 26 to the rear panel 28 close to the monitor 36. The fastening point of the tension means 38 at the rear panel 28 thus is distant from the module-side fastening area of the airbag. The tension means 38 helps to retain said area of the rear panel 28 more closely to the contact panel 26 than without the tension means 38 so that by means of the tension means 38 the rear panel 28 does not contact the monitor 36. The tension means 38 provided to prevent the airbag from contacting the monitor 36 is located, generally speaking, at the end of the front airbag 10 closer to the central vehicle axis.

As can further be inferred from FIG. 1, the tension means 30 partially converge toward their module-side end and optionally may be jointly fastened here. In this way, when viewed from above, a V-shaped extension of tension means relative to each other is resulting.

It is evident from FIG. 1 that plural tension means 30 which in turn are locked by their module-side end at different fastening points are active in the area of each indentation 32. This helps the position of the indentation 32 to become even more accurately adjustable in the Y direction. However, these are options only.

As is visible from FIG. 1, the contact panel 26 is composed of plural interconnected cut parts 42, 44 which are fastened to each other at the indentations 32 via connectors 40, connecting seams in this case. Said connectors may also serve for arranging the tension means 30 on the contact panel 26.

Figure 7:
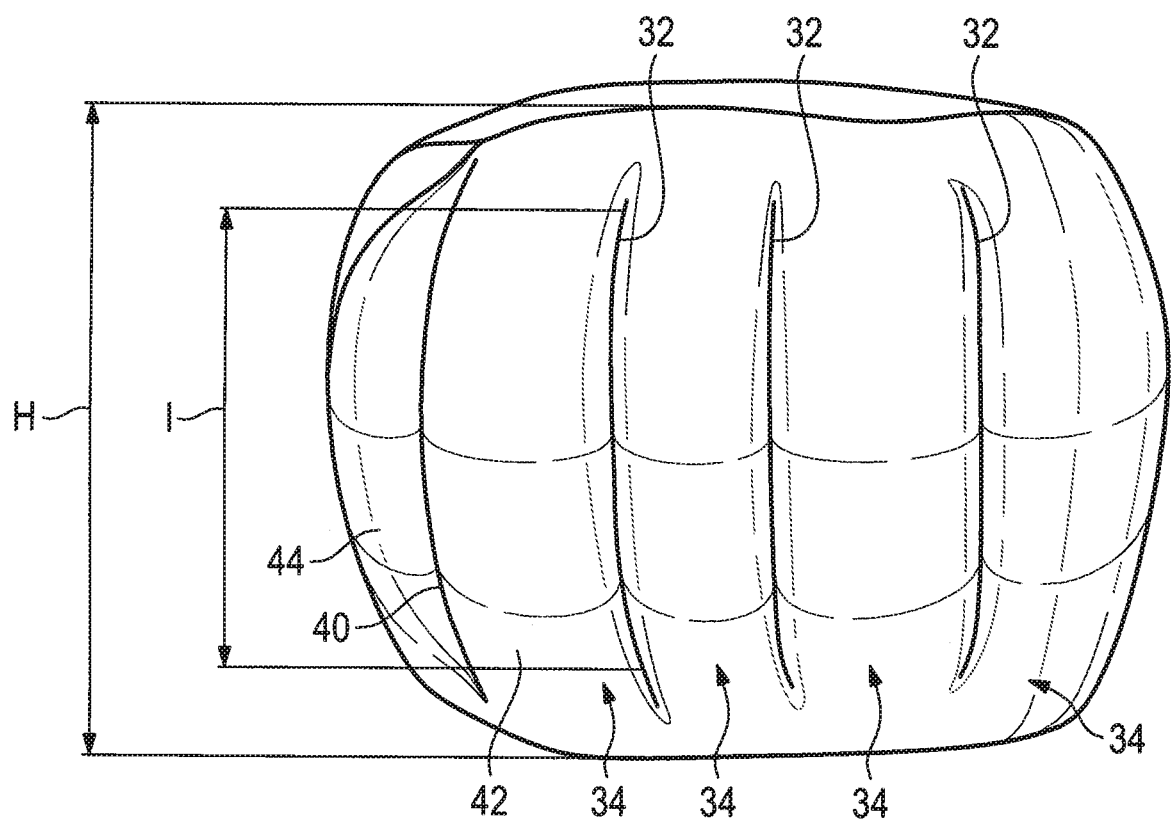
FIG. 7 shows a front view of the airbag according to the invention in the inflated state.

FIG. 7 illustrates the airbag in the inflated state when viewing the contact panel 26. The vertically extending barrel-shaped beads 34 are separated from each other by the indentations 32. The vertically extending linear indentations 32 have a deepest point that is defined by connectors 40 to the tether 30.

The vertical length I of the tethers at the connecting line to the contact panel 26 amounts to at least 60%, preferably at least 75% of the vertical height H of the contact panel 26 from the upper edge to the lower edge in the area of the indentation 32. Said lengths are measured in the inflated state of the airbag (cf. FIG. 7).

Figure 5:
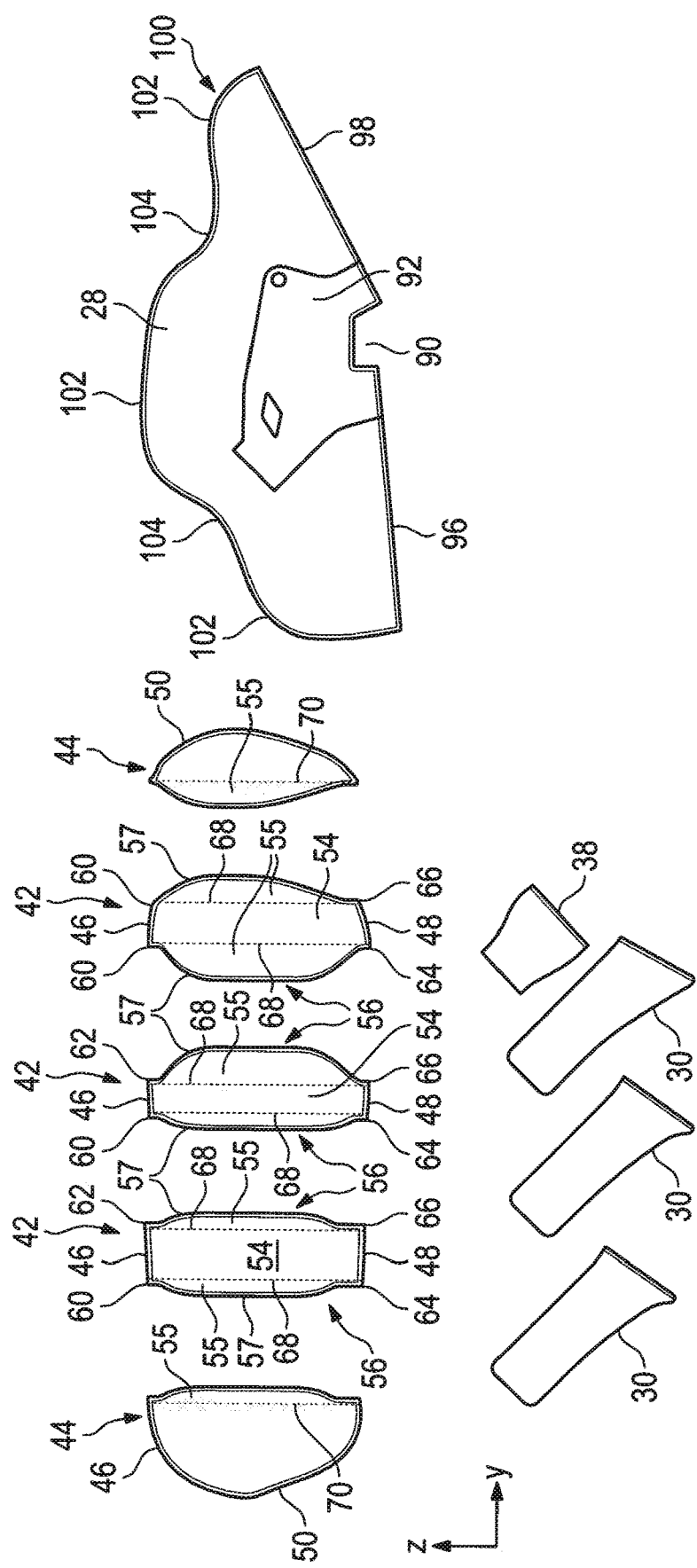
FIG. 5 shows cut parts of the contact panel and the rear panel of the airbag according to the invention according to FIG. 2 with a contact panel shown in an expanded state.

The cut parts of the contact panel 26 are shown in FIG. 5 and comprise central cut parts 42 as well as two lateral cut parts 44. The cut parts 42, 44 are flatly spread in FIG. 5 and are shown in a not yet interconnected state so that the upper edges 46 thereof are orientated forwards or upwards and the lower edges 48 are orientated in the opposite direction. The upper edges 46, in the assembled state of the airbag, are those edges which also form the upper edge 146 (see FIG. 2) of the airbag. The lower edges 48 then form the lower edge 148 of the airbag and of the contact panel. Moreover, the lateral cut parts 44 including the lateral edges 50 thereof in the assembled state form the lateral edges 150 of the airbag.

All cut parts 42 are longer than wide in the vertical direction. At the upper edge 46 and at the lower edge 48 as well as at the lateral edges 50, the contact panel 26 is sewn to the rear panel 28 the cut of which is equally shown in FIG. 5.

The lateral cut parts 44 have a substantially crescent-shaped cut.

As is evident from FIG. 5, the central cut parts 42 are narrower at the upper and lower ends thereof, which are formed by the upper and lower edges 46 and, resp., 48 here, than a so-called central area 54 between the ends. In this central area 54, the cut parts 42 are bulging laterally outwardly. The bulging takes the reference numeral 55.

In the central area delimited by the lateral edges 57, substantially linear peripheral portions 56 are provided which extend substantially vertically and in portions are parallel or completely parallel to each other. From said linear peripheral portions 56 the central area then extends in continuous curvatures toward the ends.

The upper and lower edges 46, 48 of the central cut parts 42 end in upper corners 60, 62 and lower corners 64, 66 constituting the transition to the lateral edges 56. Virtual connecting lines 68 of vertically opposed corners 60 and 64 and, resp., 62 and 66 extend, on the one hand, within each cut part 42 and, on the other hand, preferably also in parallel to each other from cut part to cut part. Furthermore, also connecting lines 70 may extend from corners of the lateral cut parts 44 in parallel to the connecting lines 68.

The adjacent cut parts 42, 44 are sewn to each other at the lateral edges 57 facing each other. The bulges 55 of the cut parts 42, 44 on the side of the connecting lines 68, 70 in a sewn-up state are resulting in pockets forming the indentations 32. Also, the tension means 30 are sewn to the linear peripheral portions 56, as is evident from FIG. 6.

Figure 6:
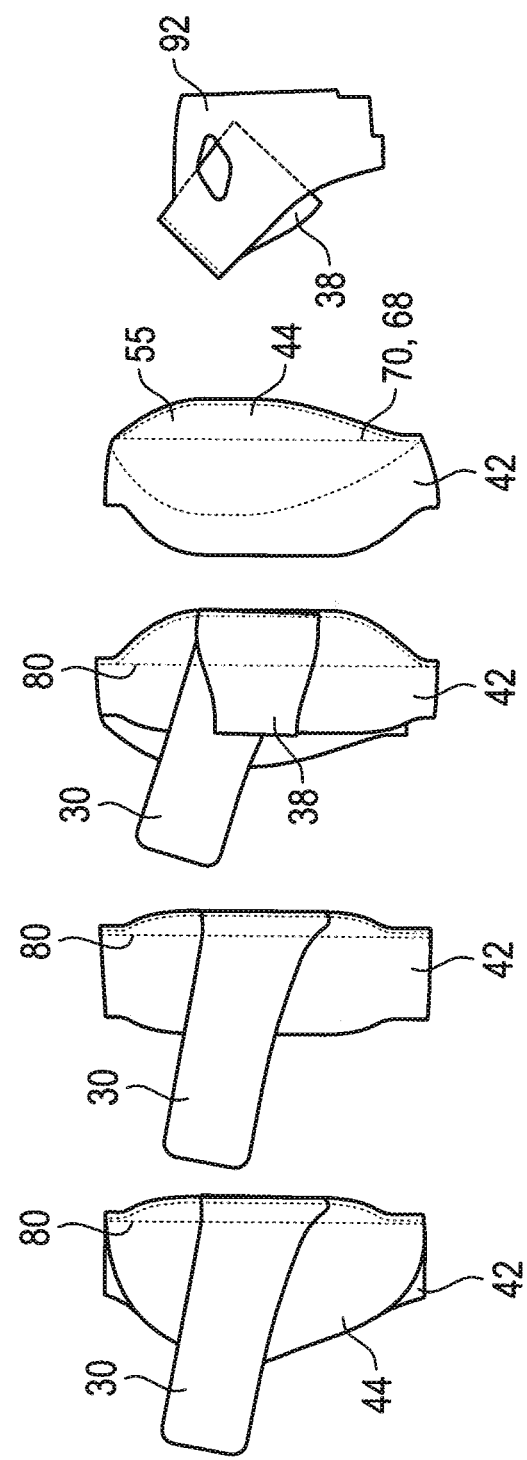
FIG. 6 shows the cut parts according to FIG. 5 including tethers fastened thereto.

Further, it is shown in FIG. 6 that adjacent cut parts 42, 44 are sewn to each other along the lateral edges 57 of the bulges 55 later forming the indentation and at said joints also the tethers (tension means 30, 38) are attached. Accordingly, it is not yet shown that said individual resulting intermediate components which are formed by first sewing, then are partially folded and repeatedly sewn to other intermediate parts so as to finally provide the constructional design shown in FIG. 2.

It is emphasized that the cut parts 42, 44 are also attached to each other by tear seams 80 even along the aforementioned virtual connecting lines 68, 70. Said tear seams 80 are evident also in FIGS. 2 to 4, in the mounted and partially inflated state shown in FIGS. 2 to 4 they extend vertically and outwardly close the indentations 32. The tear seams 80 help to position the material forming the indentations 32 exactly relative to each other so that folding in this area of the airbag is significantly easier and, above all, more predeterminable than without the tear seams 80. Upon inflation of the airbag, prior to reaching the completely inflated state, the tear seams 80 break open so that the beads 34 are more distinct, as is shown by the comparison of FIGS. 1 and 2.

The bead 34 on the left in FIG. 1 and closest to the adjacent vehicle occupant is defined by two cut parts, namely by the cut part 44 on the right in each of FIG. 5 and FIG. 6 and the adjacent central cut part 42. The connector 40 (connecting seam) between the two cut parts 42, 44 forming the left bead 34 is also evident from FIG. 7. It is important, in this context, that no tension means 30 is provided between said two cut parts 42, 44 and the superimposed bulges 55 thereof visible in FIG. 6.

Vis-à-vis the virtual connecting lines 68, 70 superimposed according to FIG. 6 of the two right-hand cut parts 42, 44 according to FIG. 5, the bulges 55 according to FIG. 6 project to the right. Said bulges form a pocket 84 which, due to the lacking tension means in this area, in the inflated or partially inflated state projects outwardly so that the bead in this case is significantly more voluminous and protrudes more closely to the occupant than the other beads.

Figure 2:
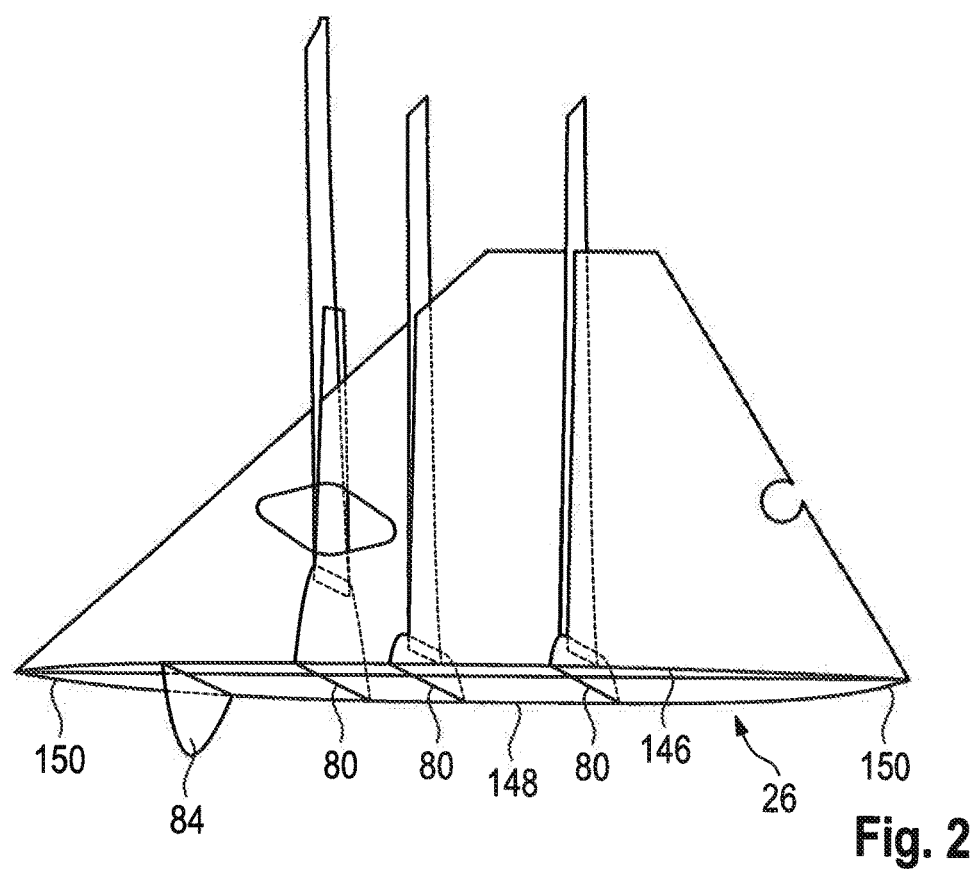
FIG. 2 shows a schematic isometric top view onto the frontal airbag according to FIG. 1, comprising a contact panel shown in an expanded state and tension means not yet fastened on the rear side, wherein the contact panel does not exhibit the convex geometry which it has in the inflated state.
Figure 3:
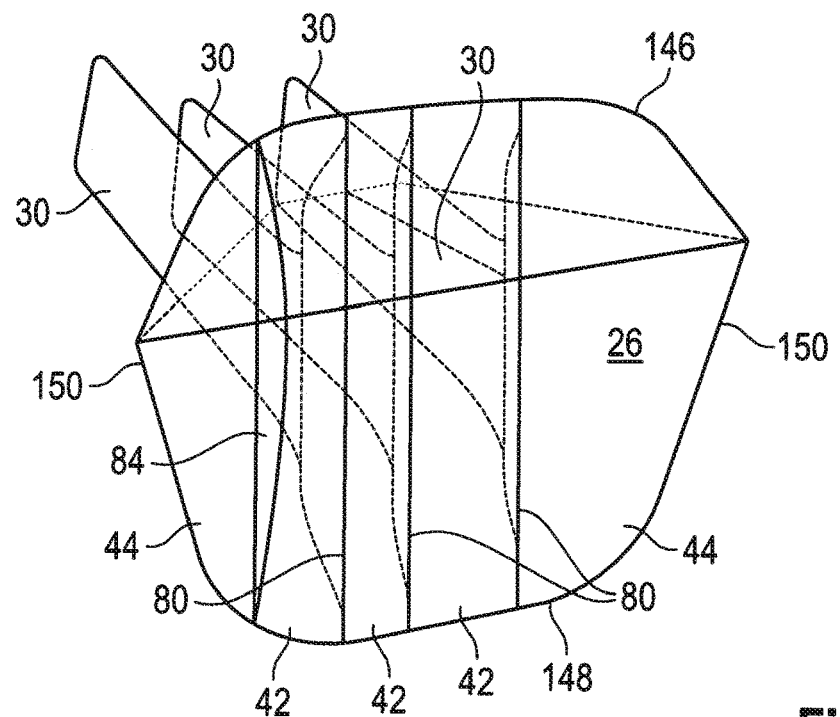
FIG. 3 shows a schematic perspective frontal view of the frontal airbag according to FIG. 2 in the not yet inflated state with a contact panel shown in an expanded state.
Figure 4:
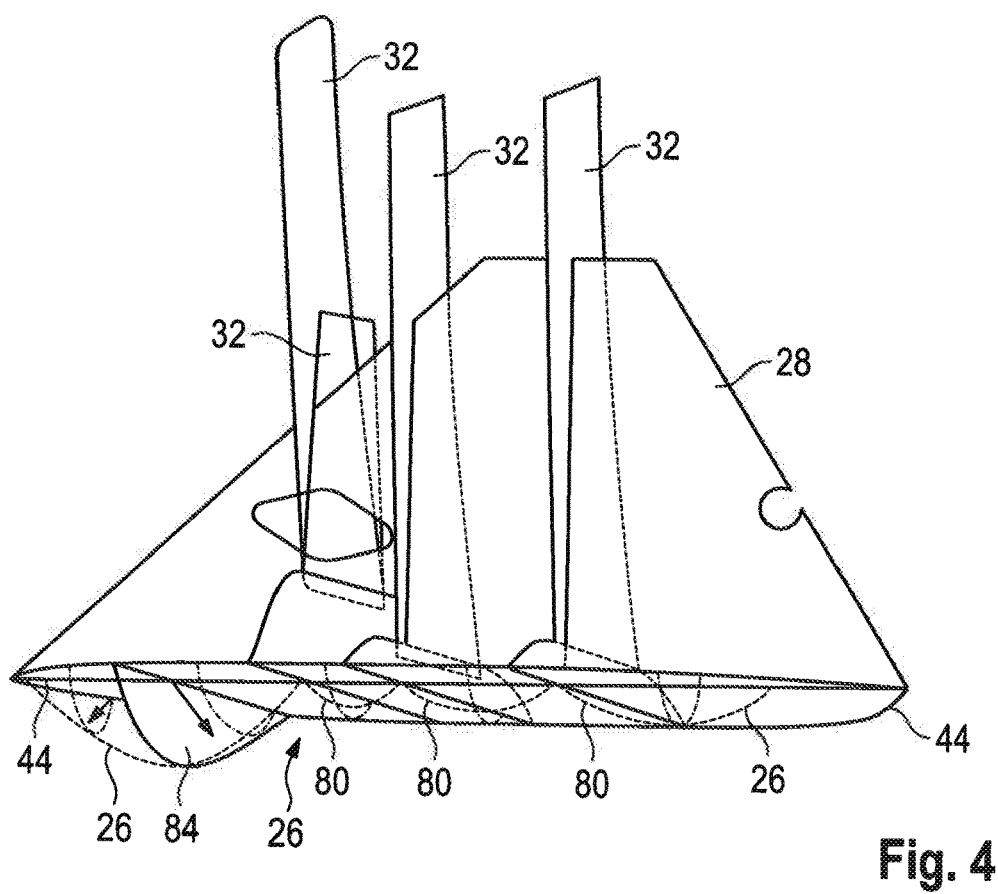
FIG. 4 shows a schematic perspective view slanted from above onto the not completely inflated frontal airbag according to FIG. 2 with a contact panel shown in an expanded state.

In FIGS. 2 to 4, the contact panel is shown to be slightly tensioned in a plane with still existing tear seams 80, wherein tensioning is so slight that the pocket 84 does not yet gape. This state is intended to show the contact panel 26 in the intact state after manufacture.

The pocket 84 then completely gapes in the inflated state of the airbag and without any step merges into the adjacent part of the left bead 34 to increase the latter. Said gaping of the pocket 84 is symbolized by arrows in FIG. 4. Then the curve of the outer contour of the contact panel 26 is indicated by broken lines in the area of the vertical center of the contact panel 26 in which no pocket 84 would be visible any more. Dot-dash lines roughly indicate the contour of the contact panel 26 in the vertical direction.

In the area of an inflation opening 90, the rear panel 28 has a reinforcing layer 92 which is attached to the rear panel by sewing. The tension means 38 is attached to said reinforcing layer 92 by sewing, as is shown in FIG. 6.

It is emphasized that the fastening of the rear ends of the tension means 30 has not been performed in FIGS. 2 to 4.

However, the tension means 30 extend from the end by which they are arranged at the contact panel 26 with twisting about 90° in the direction of the rear panel 28 (see FIG. 4).

As is evident, in the shown frontal airbag 10 presently three indentations 32 that extend vertically and in parallel to each other and correspondingly parallel, vertically extending beads 34 are formed.

The rear panel 28 is shown in its cut in FIG. 5. The rear panel 28 is delimited by two linear edges 96, 98 extending substantially in opposite directions at an angle of 150° to 180° as well as by a curved peripheral portion 100 connecting the outer ends of the said linear edges 96, 98. The curved peripheral portion 100 comprises three convex areas 102 as well as concave areas 104 connecting said convex areas 102.

The invention claimed is:

1. A frontal airbag for vehicle occupants comprising a contact panel (26) in the inflated state facing the vehicle occupant and comprising upper and lower edges (146, 148) as well as two lateral edges (150), wherein tension means (30) that withhold portions of the contact panel (26) in the inflated state of the airbag so that the contact panel (26) forms plural indentations (32) are disposed in the airbag interior at the contact panel (26), wherein the contact panel (26) is composed of plural interconnected cut parts (42, 44), wherein, before complete deployment of the airbag, the indentations (32) are closed by tear seams (80), with the tear seams (80) being configured in such a way that they can be destroyed when the airbag is completely inflated.

2. The frontal airbag according to claim 1, wherein, related to the partially deployed mounted state of the airbag, the tear seams (80) extend vertically and/or in parallel to each other.

3. The frontal airbag according to claim 1, wherein at least several of the cut parts (42, 44) related to the inflated state of the airbag, are longer than wide in the vertical direction.

4. The frontal airbag according to claim 1, wherein at least several of the cut parts (42, 44) extend continuously from the upper edge to the lower edge (146, 148).

5. The frontal airbag according to claim 1, wherein at least several of the cut parts (42, 44) are fastened to a rear panel (28) in the area of the upper and lower edges (146, 148).

6. The frontal airbag according to claim 1, wherein at least several of the cut parts (42, 44) have an upper end and a lower end which are horizontally narrower than the central area (54) located between the ends.

7. The frontal airbag according to claim 6, wherein at least several, preferably all of the cut parts (42, 44) in the central area (54) include bulges (55) laterally facing opposite directions.

8. The frontal airbag according to claim 7, wherein cut parts (42) in the central area (54) include vertical and substantially linear peripheral portions (56) from which the central area (54) extends toward the vertical ends in continuous curvatures.

9. The frontal airbag according to claim 6, wherein the contact panel (26) is defined at each of the lateral ends by a lateral cut part (44) and therebetween plural central cut parts (42) are located, wherein at least one of the central cut parts (42) has corners (60-66) forming a transition from the upper and lower edges (46, 48) to the central area (54), with upper and lower corners (60-66) being assigned to each other in pairs and being opposed to each other, with virtual connecting lines (68) extending in parallel to each other between upper and lower corners (60-66) assigned to each other in the spread state of the cut part (42).

10. The frontal airbag according to claim 1, wherein in the inflated and mounted state of the airbag the contact panel (26) forms at least one vertically extending elongate bead (34).

11. The frontal airbag according to claim 9, wherein the contact panel (26) is formed in portions at the bead (34) by adjacent bulges (55) of two adjacent interconnected cut parts (42, 44), wherein no tension means is provided at the bead.

12. The frontal airbag according to claim 1, wherein the contact panel (26) is defined at each of the lateral ends by a lateral cut part (44) having a substantially crescent-shaped cut.

13. The frontal airbag according to claim 1, wherein tension means (30) are arranged in the area of the vertical edges of cut parts.

14. The frontal airbag according to claim 13, wherein the tension means (30) are equally fastened to the contact panel (26) by the connector that fastens adjacent cut parts (42, 44) to each other.

15. The frontal airbag according to claim 1, wherein a rear panel (28) is provided in the form of a one-piece cut part.

16. The frontal airbag according to claim 15, wherein the rear panel (28) includes two linear edges (96, 98) substantially extending in opposite directions which at their remote ends merge into a curved peripheral portion (100), the curved peripheral portion (100) interconnecting the two remote ends of the linear edges (96, 98) and the curved peripheral portion (100) preferably consisting of three convex areas (102), with adjacent convex areas (102) being connected to each other by a concave area (102).

17. The frontal airbag according to claim 1, wherein the tension means (30) are tethers.

18. The frontal airbag according to claim 1, wherein the indentations (32) extend substantially vertically, related to the mounted and inflated state of the airbag.

19. The frontal airbag according to claim 1, wherein at least two indentations (32) are provided.

20. The frontal airbag according to claim 1, wherein tension means (38) connects a portion of the rear panel (28), which is remote from an area of the rear panel (28) to which the latter is fastened on the module side, and the contact panel (26) to each other so as to retain the rear panel (28) more closely to the contact panel (26) in this area, with the respective tension means (38) being located at the end of the airbag closer to the central vehicle axis.

* * * * *